United States Patent
Dua et al.

(10) Patent No.: US 10,539,119 B2
(45) Date of Patent: Jan. 21, 2020

(54) SYSTEM AND METHOD FOR AUGMENTING CONTROL OF A WIND TURBINE ASSEMBLY

(71) Applicant: WindESCo, Inc., Boston, MA (US)

(72) Inventors: Mohit Dua, Bedford, MA (US); Nathan L. Post, Malden, MA (US); Jonathan A. Kossuth, Sudbury, MA (US); Brendan F. Taylor, South Burlington, VT (US); David Hastings, Dumfries (GB)

(73) Assignee: WindESCo, Inc., Boston, MA (US)

( * ) Notice: Subject to any disclaimer, the term of this patent is extended or adjusted under 35 U.S.C. 154(b) by 18 days.

(21) Appl. No.: 15/950,710

(22) Filed: Apr. 11, 2018

(65) Prior Publication Data

US 2019/0010923 A1    Jan. 10, 2019

Related U.S. Application Data

(60) Provisional application No. 62/530,663, filed on Jul. 10, 2017.

(51) Int. Cl.
*F03D 7/04* (2006.01)
*F03D 17/00* (2016.01)
(Continued)

(52) U.S. Cl.
CPC ........... *F03D 7/047* (2013.01); *F03D 7/0264* (2013.01); *F03D 7/0288* (2013.01);
(Continued)

(58) Field of Classification Search
None
See application file for complete search history.

(56) References Cited

U.S. PATENT DOCUMENTS

| 4,297,076 A | 10/1981 | Donham et al. |
| 6,619,918 B1 | 9/2003 | Rebsdorf |

(Continued)

FOREIGN PATENT DOCUMENTS

| DE | 30 09 922 A1 | 9/1981 |
| EP | 1 947 329 A1 | 7/2008 |

(Continued)

OTHER PUBLICATIONS

ASTM International, "Standard Practices for Cycle Counting in Fatigue Analysis," Designation: E 1049-85, 10 pages (2005).

(Continued)

*Primary Examiner* — Ryan A Jarrett
(74) *Attorney, Agent, or Firm* — Hamilton, Brook, Smith & Reynolds, P.C.

(57) ABSTRACT

Embodiments of the present disclosure include a data processing and control augmentation system capable of identifying overloading of one or more wind turbine assemblies and providing information to a wind farm controller to reduce a power output of each overloaded turbine. The augmentation system thus reduces the power output of each overloaded turbine and, in turn, reduces loads applied to the wind turbine assembly, such as for a period of time until conditions favorably change. A described analysis of the present disclosure is able to utilize several incoming data streams from sensors so arranged to measure wind effects on blades to calculate and compare cyclic loads to threshold limits to o keep the loads within design limits. The control strategy reduces premature failure of components within the wind turbine assembly, and can be applied across an entire wind farm, even with only a subset of wind turbine assemblies being retrofitted.

30 Claims, 12 Drawing Sheets

(51) Int. Cl.
*F03D 7/02* (2006.01)
*G05B 15/02* (2006.01)
*G06F 17/16* (2006.01)
*G06F 17/14* (2006.01)

(52) U.S. Cl.
CPC .......... *F03D 7/0292* (2013.01); *F03D 7/048* (2013.01); *F03D 17/00* (2016.05); *G05B 15/02* (2013.01); *F05B 2230/80* (2013.01); *F05B 2270/109* (2013.01); *F05B 2270/331* (2013.01); *F05B 2270/332* (2013.01); *F05B 2270/335* (2013.01); *G06F 17/142* (2013.01); *G06F 17/16* (2013.01)

(56) References Cited

U.S. PATENT DOCUMENTS

| | | | |
|---|---|---|---|
| 6,876,099 B2 | 4/2005 | Wobben |
| 6,940,186 B2 | 9/2005 | Weitkamp |
| 7,004,724 B2 | 2/2006 | Pierce et al. |
| 7,086,834 B2 | 8/2006 | LeMieux |
| 7,160,083 B2 | 1/2007 | Pierce et al. |
| 7,175,389 B2 | 2/2007 | Moroz |
| 7,357,622 B2 | 4/2008 | Corten et al. |
| 7,692,322 B2 | 4/2010 | Wakasa et al. |
| 7,822,560 B2 | 10/2010 | LeMieux |
| 7,854,589 B2 | 12/2010 | Nielsen et al. |
| 7,896,613 B2 | 3/2011 | Xiong |
| 8,033,788 B2 | 10/2011 | Egedal et al. |
| 8,039,981 B2 | 10/2011 | Egedal et al. |
| 8,093,738 B2 | 1/2012 | Stiesdal |
| 8,096,762 B2 | 1/2012 | Risager et al. |
| 8,123,478 B2 | 2/2012 | Ahmann |
| 8,157,522 B2 | 4/2012 | Bolz |
| 8,161,822 B2 | 4/2012 | Volanthen |
| 8,215,905 B2 | 7/2012 | Slack |
| 8,222,757 B2 | 7/2012 | Schulten |
| 8,234,083 B2 | 7/2012 | Olesen |
| 8,255,173 B2 | 8/2012 | Fujioka et al. |
| 8,277,185 B2 | 10/2012 | Menke |
| 8,398,369 B2 | 3/2013 | Rebsdorf et al. |
| 8,454,311 B2 | 6/2013 | Hiremath et al. |
| 8,511,177 B1 | 8/2013 | Makaremi |
| 8,718,831 B2 | 5/2014 | Wang et al. |
| 8,757,003 B1 | 6/2014 | Makaremi |
| 8,907,511 B2 | 12/2014 | Bowyer et al. |
| 8,928,164 B2 | 1/2015 | Bowyer et al. |
| 8,987,929 B2 | 3/2015 | Jayant et al. |
| 9,018,788 B2 | 4/2015 | Bertolotti et al. |
| 9,032,807 B2 | 5/2015 | Olesen |
| 9,133,828 B2 | 9/2015 | Egedal et al. |
| 9,188,104 B2 | 11/2015 | Bowyer et al. |
| 9,201,410 B2 | 12/2015 | Ambekar et al. |
| 9,255,886 B2 | 2/2016 | Glavind et al. |
| 9,261,077 B2 | 2/2016 | Tirumalai et al. |
| 9,316,571 B2 | 4/2016 | Muller et al. |
| 9,353,727 B2 | 5/2016 | Slot |
| 9,399,983 B2 | 7/2016 | Lindby et al. |
| 9,422,917 B2 | 8/2016 | Hammerum et al. |
| 9,523,354 B2 | 12/2016 | Olesen |
| 2007/0124025 A1 | 5/2007 | Schram et al. |
| 2009/0129924 A1 | 5/2009 | Rebsdorf et al. |
| 2009/0263245 A1* | 10/2009 | Shi .............. F03D 7/02 416/43 |
| 2010/0274401 A1 | 10/2010 | Kjaer et al. |
| 2010/0310373 A1 | 12/2010 | Castell Martinez |
| 2011/0193344 A1 | 8/2011 | Lafferty et al. |
| 2012/0211986 A1 | 8/2012 | Bertolotti et al. |
| 2012/0292905 A1 | 11/2012 | Slot |
| 2013/0015662 A1 | 1/2013 | Bertolotti et al. |
| 2013/0093879 A1 | 4/2013 | Bertolotti |
| 2013/0166082 A1 | 6/2013 | Ambekar et al. |
| 2016/0186722 A1 | 6/2016 | Olesen |

FOREIGN PATENT DOCUMENTS

| | | |
|---|---|---|
| EP | 2302207 A1 | 3/2011 |
| EP | 2 626 549 A1 | 8/2013 |

OTHER PUBLICATIONS

Hoffmann, "Applying Wheatstone Bridge Circuit," HBM W1569-1.0 en, 36 pages (2001).

IEC, "Wind turbine generator systems—Part 13: Measurement of mechanical loads," Technical Specification TS 61400-13, 76 pages (2001).

International Search Report and Written Opinion for Int'l Application No. PCT/US2018/032920, titled: "System and Method for Augmenting Control of a Wind Turbine Assembly," dated Sep. 6, 2018.

\* cited by examiner

| TIME 1101 | MEAN BLADE 1 Mxb (kNm) 1102 | MEAN BLADE 1 Myb (kNm) 1103 | MEAN BLADE 1 Mxc (kNm) 1104 | MEAN BLADE 1 Myc (kNm) 1105 | MEAN Mys (kNm) 1106 | MEAN Mzs (kNm) 1107 | POWER PRODUCED (kW) 1108 | AVERAGE WIND SPEED m/s 1109 |
|---|---|---|---|---|---|---|---|---|
| 5:00 | 854 | 103 | 302 | 806 | 423 | 74 | 2274 | 17.9 |
| 5:01 | 904 | 116 | 354 | 850 | 493 | 45 | 2272 | 17.9 |
| 5:02 | 843 | 101 | 300 | 795 | 399 | 107 | 2279 | 18.0 |
| 5:03 | 858 | 106 | 307 | 808 | 472 | 61 | 2273 | 17.9 |
| 5:04 | 849 | 102 | 305 | 800 | 329 | 89 | 2271 | 18.0 |
| 5:05 | 850 | 101 | 302 | 802 | 430 | 95 | 2276 | 17.9 |
| 5:06 | 860 | 101 | 304 | 811 | 459 | 155 | 2271 | 18.0 |
| 5:07 | 878 | 109 | 311 | 829 | 448 | 82 | 2271 | 18.0 |
| 5:08 | 895 | 116 | 317 | 846 | 574 | 192 | 2270 | 17.9 |
| 5:09 | 909 | 121 | 322 | 858 | 621 | 153 | 2279 | 17.8 |
| 5:10 | 895 | 116 | 318 | 845 | 575 | 171 | 2270 | 18.1 |
| 5:11 | 896 | 116 | 316 | 847 | 489 | 192 | 2280 | 17.8 |
| 5:12 | 845 | 103 | 300 | 798 | 462 | 163 | 2275 | 18.0 |
| 5:13 | 826 | 98 | 295 | 777 | 546 | 119 | 2279 | 18.0 |
| 5:14 | 813 | 93 | 288 | 766 | 344 | 15 | 2245 | 18.3 |
| 5:15 | 972 | 142 | 345 | 920 | 501 | 37 | 2239 | 17.1 |
| 5:16 | 974 | 142 | 338 | 924 | 695 | -140 | 2280 | 16.3 |
| 5:17 | 881 | 114 | 309 | 833 | 617 | -74 | 2279 | 17.1 |
| 5:18 | 864 | 109 | 302 | 817 | 593 | -39 | 2274 | 17.5 |
| 5:19 | 893 | 124 | 319 | 844 | 622 | -206 | 2268 | 17.5 |
| 5:20 | 899 | 120 | 316 | 850 | 547 | -248 | 2275 | 17.0 |

FIG. 11

SYSTEM AND METHOD FOR AUGMENTING CONTROL OF A WIND TURBINE ASSEMBLY

RELATED APPLICATION

This application claims the benefit of U.S. Provisional Application No. 62/530,663 filed on Jul. 10, 2017. The entire teachings of the above application are incorporated herein by reference.

BACKGROUND

Wind power is a major source of electricity with nearly 550 GW of global installed capacity at the end of 2017. This is expected to increase to nearly 800 GW by 2021. However, operating wind power projects and wind farms continue to underperform on power output by 9% on average. This, coupled with much higher than expected unscheduled maintenance costs caused mostly by high component failure rate, is leading to lower revenue and higher operating expense. The industry is further challenged by reduction in incentives and subsidies as power prices continue to drop. Studies conducted by those in the wind power industry using measurement systems on wind turbines have shown that loads on wind turbines in some locations and under specific wind conditions may significantly exceed design loads for the wind turbines, thus leading to premature component failures.

SUMMARY

A wind turbine is designed to covert mechanical power harvested from the air moving past the blades to electrical power. One of the central components of a wind turbine is the drivetrain comprised of shafts, bearings and gearbox that couple the rotor (the hub and blades) to the generator. In direct drive machines, the drivetrain includes the shaft and bearings although no gearbox is present. The drivetrain of a wind turbine is one of the most critical components and is subject to hundreds of millions of rotational cycles, high variable torque, and bending loads generated by asymmetric loading of the rotor. These loads are primarily transferred into the drivetrain through the main shaft with the rotor mounted on one end of this shaft. Damage to drivetrain components is one of the leading causes of downtime in the industry and involves expensive repairs often requiring removal of the rotor using a large crane.

While there are several drivetrain condition monitoring systems on the market that are designed to identify when drivetrain damage occurs, there is a lack of products designed to reduce the failure rate of these high value components in the first place. Active, independent, blade-pitch load control has been studied extensively, and is available in some of the most recent offerings; however, such blade-pitch load control is not a cost effective retrofit solution for existing wind farms.

Embodiments of the present disclosure can be used to reduce loads and extend the lifetime of any mechanical component or system in the wind turbine including the blades, pitch system, hub, yaw drive, mainframe, tower and foundation.

Embodiments of the present disclosure include a data processing and control augmentation system capable of identifying overloading of a wind turbine assembly (or individual wind turbine component) and providing information to a wind farm controller (or individual turbine controller) to stop or change a power limit of an overloaded wind turbine. Reducing an overloaded wind turbine's maximum power output reduces the load applied to a wind turbine assembly. Once conditions change and mechanical loads are reduced, normal operation may be resumed. This control strategy limits loads during a high impact event and thus reduces the chances of premature failure of major components. Existing systems typically require integration directly into the turbine controller to reduce loading by, for example, modifying blade pitch angles. While this may be effective for reducing the loads on the assembly or a component, such a retrofit is significantly more complex to integrate into an existing machine compared to the system and method described in the present disclosure. Thus, embodiments of the present disclosure provide cost effective technological solutions for detecting overloaded components of a wind turbine assembly and reducing or eliminating the overload condition to extend the life of the wind turbine assembly as a whole, as well as its individual components.

According to at least one embodiment of the present disclosure, a method of augmenting control of a wind turbine assembly comprises determining a sequence of loads on a blade of a wind turbine assembly in a revolution of a rotor associated with the blade; calculating a characteristic of a cyclic load on a component of the wind turbine assembly over at least one revolution of the rotor as a function of the determined sequence of loads; and presenting a control input signal to augment control of the wind turbine assembly as a function of the calculated characteristic of the cyclic load.

In some embodiments, the sequence of loads may be any of: a sequence of bending moments of the blade in one or more directions, a sequence of axial forces, or a sequence of shear forces. In some embodiments, the calculated characteristic of the cyclic load may be a mean of the sequence of loads, an extrema of the sequence of loads, a range or amplitude of the sequence of loads, a frequency of the sequence of loads, or any other characteristic that may be determined from a sequence of data points associated with the cyclic load.

The at least one embodiment may further comprise obtaining an operating state of the wind turbine assembly; and wherein the control input signal to augment control of the wind turbine assembly is a function of the calculated characteristic of the cyclic load and the obtained operating state of the wind turbine assembly. Additionally, the at least one embodiment may further comprise determining the acceleration of a given component of the wind turbine assembly; and wherein the calculated characteristic of the cyclic load is calculated as a function of the determined sequence of loads and the determined acceleration of the given component over at least one revolution of the rotor associated with the blade.

In some embodiments, a Fast Fourier Transform (FFT) of the acceleration and/or loads calculated over at least one revolution of the rotor associated with the blade may be used to identify the primary frequencies and amplitude of oscillation at those frequencies. The control input may then be a function of the calculated amplitude at specific frequencies of interest to the wind turbine assembly. Frequencies of interest include the primary resonance modes of the components of the wind turbine such as the first or second resonance frequency of the blades or tower.

In some embodiments, presenting the control input causes the wind turbine assembly to stop operation or modify the power limit as a function of the calculated characteristic of the cyclic load.

In some embodiments, the wind turbine assembly is a first wind turbine assembly, and the embodiment further comprising presenting control input to augment control of a second wind turbine assembly as function of the calculated characteristic of the cyclic load of the first wind turbine assembly. This may be further expanded to present control input to augment the control of multiple second wind turbine assemblies as a function of the calculated characteristic of the cyclic load on multiple first wind turbine assemblies and an operating state of some or all of the turbines present in an arrangement of wind turbine assemblies.

The at least one embodiment may further comprise evaluating an effect of the calculated characteristic of the cyclic load on expected lifespan the component of the wind turbine assembly. Evaluating the effect may be used in calculating the control input or may be reported to a party responsible for the wind turbine assembly or assemblies.

According to some embodiments, the sequence of loads on the blade and the acceleration of the given component are determined from the obtained operating states of the wind turbine assembly. In some embodiments, the sequence of loads are determined from representations of loads measured by at least one sensor on or in the blade of the wind turbine assembly. Remote sensors may also be employed to determine the sequence of loads.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 11 provides an example of various representations of the mean 1 minute load calculated from the cyclic loads on the blades and main shaft of a turbine during operation in tabular form.

DETAILED DESCRIPTION

Embodiments of the present disclosure include a method and system to augment control of a wind turbine assembly that can directly influence operation of a wind farm through communication with the wind farm system (e.g., a wind farm controller, turbine controller, supervisory control and data acquisition (SCADA) server, or any other data acquisition system on the wind farm) or under certain circumstances directly with a wind turbine controller from a central control unit. By adjusting maximum power output or stopping individual wind turbines in response to loads (or calculated characteristics of cyclic loads), the embodiments of the method and system reduce mechanical wear and damage on wind turbine assemblies and their individual components. In addition, the system can provide feedback to a wind farm operator about the loads and expected remaining useful life of the wind farm's wind turbine assets.

Figure 1:
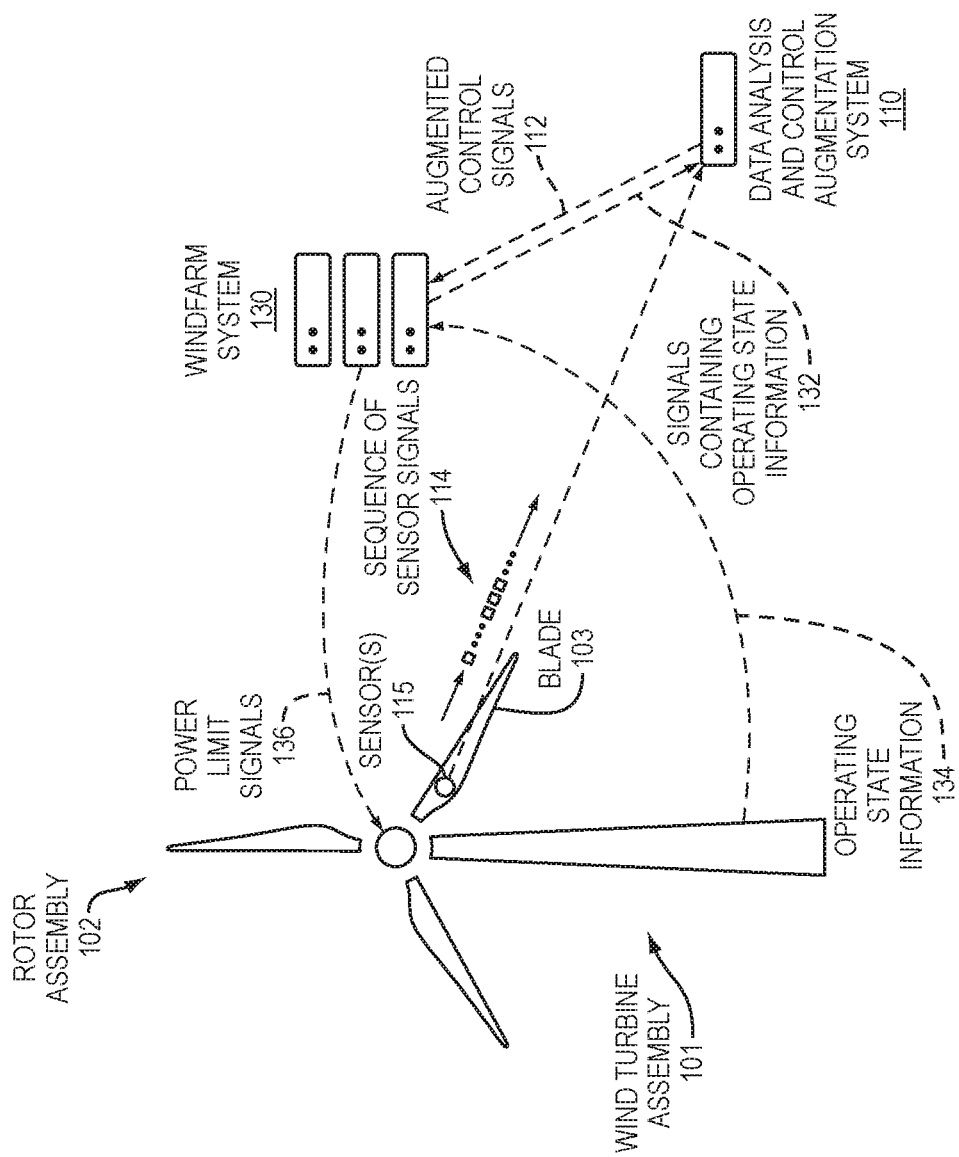
FIG. 1 is a diagram of a wind turbine assembly with a system for controlling the wind turbine assembly and a system for augmenting control of the wind turbine assembly according to some embodiments.

FIG. 1 illustrates a wind farm system 130 communicatively coupled to one or more wind turbine assemblies 101 of a wind farm. According to some embodiments, the wind farm system 130 may include an existing data acquisition system which acquires data regarding the operating states of one or more of the wind farm's wind turbine assemblies. In some embodiments, the wind farm system 130 may also include a wind farm control system (e.g., a wind farm controller, turbine controller, supervisory control and data acquisition (SCADA) server) that sets the maximum power output (i.e., power limit) of at least some of the wind turbine assemblies 101 of a wind farm.

According to some embodiments, the wind farm system 130 communicates a maximum power limit 136 to the individual turbine controllers mounted in each wind turbine assembly 101 over a digital communications network path within a digital communications network. An analog, optical, or wireless communications network may alternatively be employed. In some embodiments, all of the elements of FIG. 1 communicate over a wind farm local area network, or through a public IP network (e.g., the Internet) or other type of IP network.

According to some embodiments, a data analysis and augmented control system 110 (i.e., data processing system) may receive signals containing operating state information 132 from the wind farm system 130. In some embodiments, the data analysis and augmented control system 110 may be communicatively coupled to sensors 115 in one or more blades 103 of a wind turbine assembly 101. The sensors 115 may be configured to generate a signal or signals that represent (or are proportional to) the mechanical loads being applied to the one or more blades 103.

Additionally, the data analysis and augmented control system 110 may collect information about the wind turbine assembly's operating state 132 from the wind farm system 130 (e.g., SCADA system or wind farm control system) and receive a sequence of sensor signals 114 from the sensors 115 mounted on one or more blades 103 of the wind turbine assembly 101. This data may be transmitted over the same network as the turbine controller of the wind turbine assembly 101 or a different network communication path, as shown in FIG. 1. A wind turbine assembly operating state 134 may include the pitch angle of the blades, generated power, current power limit, rotational speed, as well as environmental measurements of the wind speed, ambient temperature, air density, or any other operating state as known in the art.

According to some embodiments, the data analysis and augmented control system 110 may determine a sequence of loads on the blade 103 of the wind turbine assembly 101 from the sensor signals 114 received from the sensors 115. The sequence of loads may be plotted as a function of time over at least one revolution of the rotor. In some embodiments, the data analysis and augmented control system 110 may calculate characteristics of cyclic loading on a component of the turbine assembly over at least one revolution of the rotor as a function of the determined sequence of loads. Components of the wind turbine assembly can be for example a rotor blade, pitch bearing, pitch drive, hub, main shaft, main bearing, gearbox, yaw bearing, yaw drive, tower, or foundation.

According to some embodiments, the sequence of loads may be in the form of time series data (i.e., a series of values over a period of time). In some embodiments, the sequence of loads may be a sequence of bending moments of the blade in one or more directions, a sequence of axial forces, or a sequence of shear forces. In some embodiments, the data analysis and augmented control system 110 may calculate a characteristic of a cyclic load on a component of the wind turbine assembly over at least one revolution of the rotor as a function of the determined sequence of loads. According to some embodiments, the calculated characteristic of the cyclic load may be a mean of the sequence of loads or an extrema of the sequence of loads, or other calculations producing characteristics known in the art to be performed on time series data (e.g., median, mode, linear trend, regression analysis, range, standard deviation, etc.).

Figure 2:
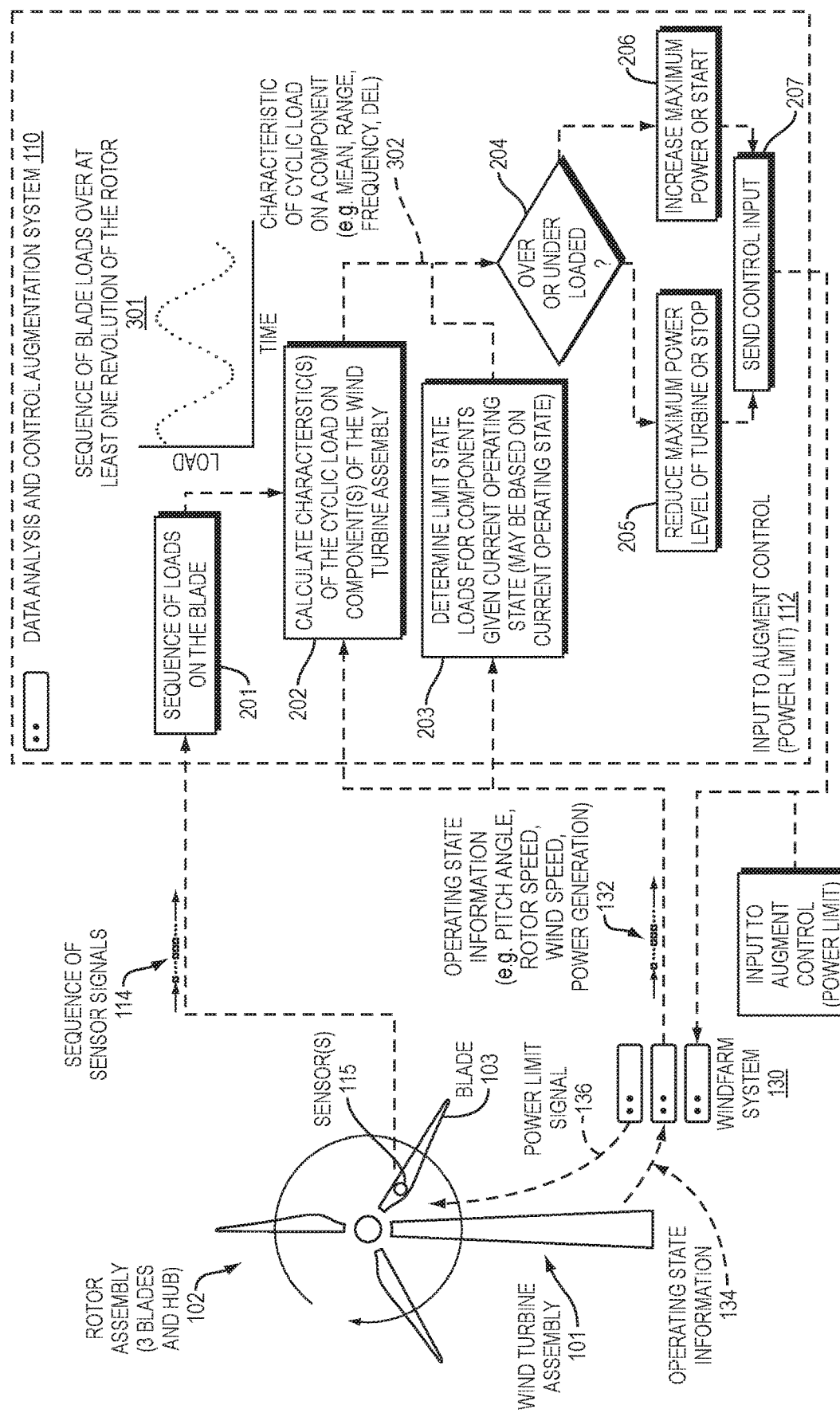
FIG. 2 is a flow chart of a data analysis and control augmentation system calculation according to some embodiments.

An example embodiment of the analysis performed by the data analysis and control augmentation system 110 is illustrated in FIG. 2. In some embodiments, the data analysis and control augmentation system 110 may first determine 201 a sequence of loads 301 on the blade 103 from the sensor signals 114 over at least one revolution of the wind turbine assembly's rotor 102. Next, the data analysis and control augmentation system 110 may calculate 202 a characteristic of a cyclic load 302 on a component of the wind turbine assembly from the sequence of loads 301 and information about the operating state 132 of the wind turbine assembly 101, including for example pitch angle of the blades or any of the other operating states list above.

In some embodiments, the data analysis and control augmentation system 110 may determine a limit state 203, the limit state being the maximum or minimum extreme value of the characteristic of the cyclic load that should be applied to the respective component of the wind turbine assembly 101. The limit state may be determined from one or more of the current operating state information 132, the design of the wind turbine assembly 101, a known value for the respective component, or the desired lifetime of the wind turbine assembly 101.

Figure 4:
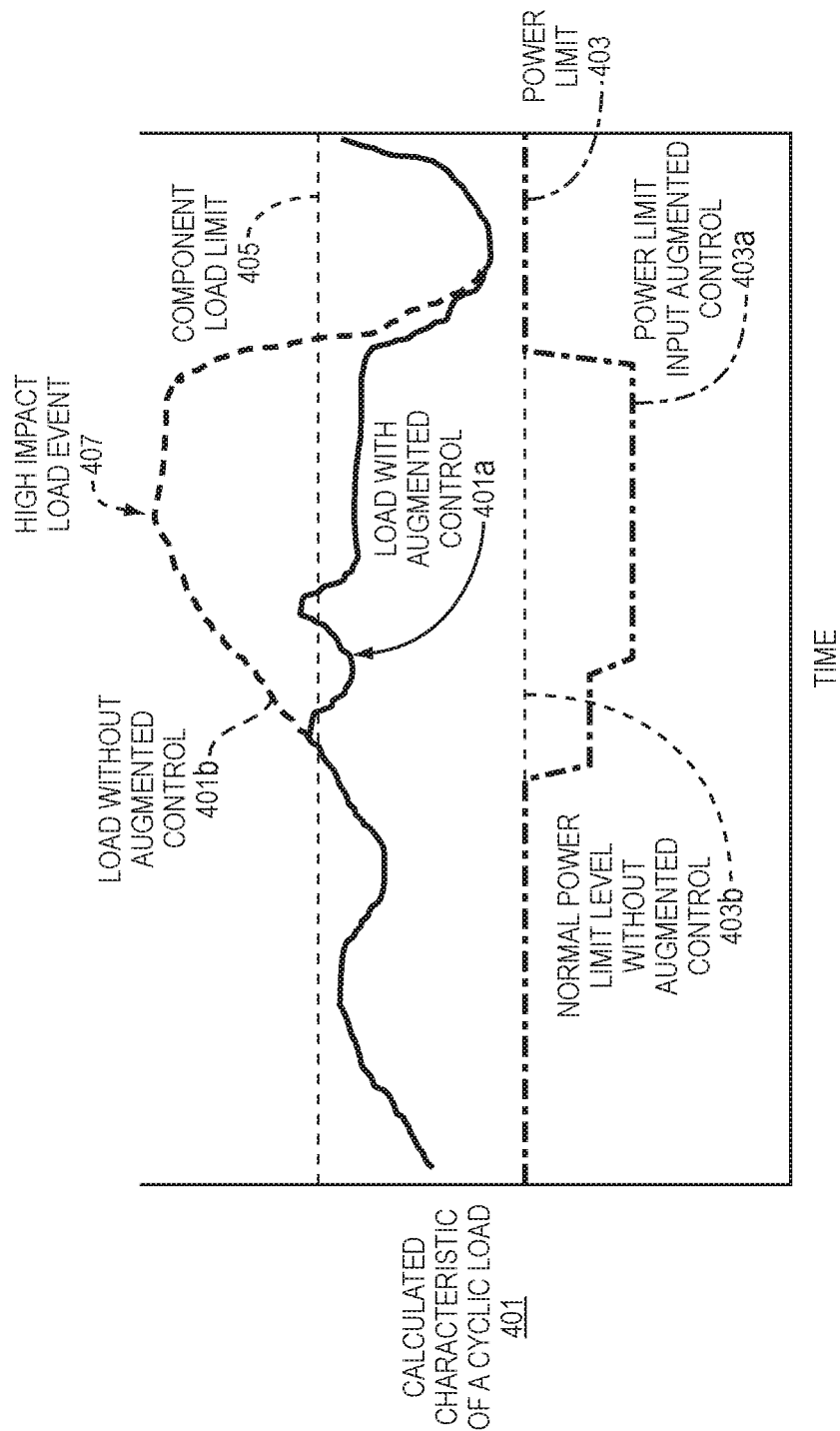
FIG. 4 depicts calculated characteristics of cyclic loads during a high load event on a wind turbine assembly being mitigated by reducing the power limit of the wind turbine assembly according to some embodiments.

The data analysis and control augmentation system 110 may compare the determined limit state of the component of the wind turbine assembly to the characteristic of the cyclic load of that component to determine whether the component is overloaded or under loaded 204. If the data analysis and control augmentation system 110 determines the component is overloaded, the maximum power level (power limit) is reduced 205 (for example as shown in FIG. 4). In some embodiments, if the maximum power limit was previously reduced and the calculated characteristic of the cyclic load of that component is significantly below the limit state, then the maximum power limit may be increased 206. In some embodiments, if the data analysis and control augmentation system 110 determines that component is not over or under loaded, the data analysis and control augmentation system 110 does not cause the maximum power limit of the wind turbine assembly 101 to be altered.

In alternative embodiments, if the data analysis and control augmentation system 110 determines the component is overloaded, the data analysis and control augmentation system 110 sends a control input to the wind farm system 130 to cause the wind turbine assembly 101 to stop instead of decreasing the maximum power limit. In some alternative embodiments, if the wind turbine assembly was previously stopped due to a high impact event and the data analysis and control augmentation system 110 determines the high impact event is over or operating condition are now in a favorable state, the data analysis and control augmentation system 110 sends a control input to the wind farm system 130 to cause the wind turbine assembly 101 to start.

According to some embodiments, the data analysis and control augmentation system 110 reduces the maximum power level or increases the maximum power level of the wind turbine assembly 101 by sending 207 a control input to the wind farm system 130, which in turn causes the maximum power level of the wind turbine assembly 101 to be altered accordingly by sending a power limit signal 136.

An embodiment implementing the immediately foregoing example approach may include using a proportional controller that changes the power limit by an amount proportional to a difference between the load and the limit state using a proportional gain setting that may be adjusted until the performance of the controller is as desired. Other embodiments may incorporate more complex controllers and tuning methods may also be employed to maintain the optimum power limit through high loading events while reducing overloading of the wind turbine assembly's components.

According to some embodiments, the data analysis and control augmentation system 110 may be configured to provide a dashboard view that displays to a remote or local operator a visualization of the augmented control activities of the data analysis and control augmentation system 110, such as by level of augmented/augmenting control signal, loading, fatigue, cyclic load characteristics, or other metric known in the art or described herein. Further, the dashboard view may be an interactive user interface, enabling the operator to adjust settings of the data analysis and control augmentation system 110 via the interactive user interface.

For the purposes of this disclosure, the wind turbine assembly 101 may include, for example, a rotor, blades, low-speed shaft, drivetrain (which may include any of shafts, bearings and gearbox that couple the rotor to the generator) main shaft, gear box, brake, yaw drive, yaw motor, generator, high-speed shaft, etc. The wind turbine assembly 101 may include the entire nacelle, the tower the nacelle rests upon, and the foundation supporting the tower and nacelle.

For the purposes of this disclosure, cyclic loading refers herein to loads or stresses that are applied repeatedly over and over again on a material or a structural component (e.g., the components of a wind turbine assembly, such as the blades, the rotor, main shaft, gearbox, tower, etc.). The cyclic loads or stresses may result in physical damage to materials or structural components even if the cyclic loads are far below a total tensile strength of the materials or structural components.

For example, cyclic loads or stresses can lead to microscopic physical damage that can accumulate over time eventually developing into a crack or other damage that leads to failure of a given material or component. Such a result of cyclic loading is referred to as fatigue. Characteristic values (i.e., calculated characteristics of cyclic loads) describing a cyclic load may be defined by a mean or average load and an amplitude or range of extrema over each cycle. In a typical embodiment, a primary cycle period is a revolution of the turbine, although some cycle loads may occur at higher or lower frequencies and can be evaluated through a process called "rainflow" counting. Alternatively, other methods of cycle counting may be used, such as the cycle counting practices described in ASTM E1049-85, "Standard Practices for Cycle Counting in Fatigue Analysis," ASTM International (2005), herein incorporated by reference.

In the case of a rotating component, a constant or nearly constant load applied in a global coordinate system results in a cyclic load on the rotating component and its materials in a local coordinate system, which is referenced to the rotating component. For example, the main shaft's bending may be constant during a period of operation when measured in global coordinates. In this case, the average value is the amplitude of a reversing cyclic load on the material in the main shaft. Therefore, in some embodiments, the data analysis and augmented control system 110 may calculate average values of applied loads which, combined with the period of the motion of the turbine, actually represent cyclic loads. For the purpose of this disclosure, these mean calculated loads are also referred to as "cyclic loads."

Figure 3:
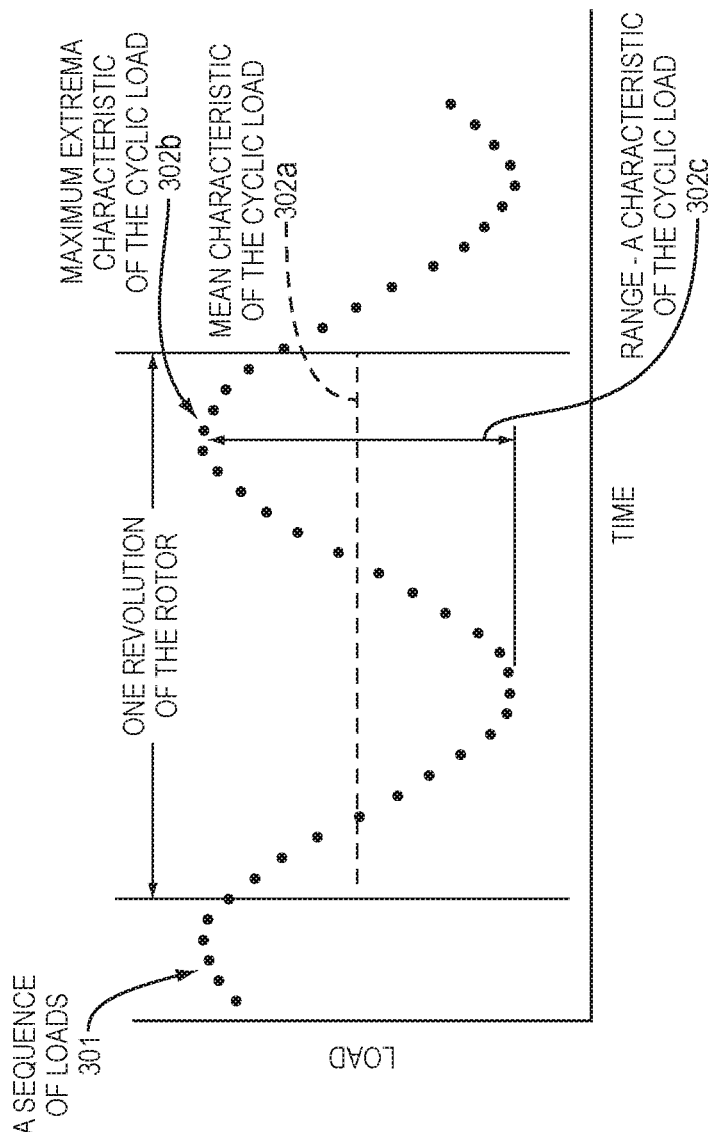
FIG. 3 depicts a sequence of loads over more than one revolution of the rotor and several characteristics of the cyclic load that may be calculated from the sequence of loads, according to one embodiment.

FIG. 3 illustrates a graphical example of a sequence of loads applied to a component of the wind turbine assembly 101. Various calculated characteristics of the cyclic load 302 applied to a component may be calculated from this sequence of loads 301 over one or more revolutions of the wind turbine assembly rotor 102. The mean 302a, maximum extrema 302b, and range 302c are shown graphically in this example. The frequency or period of the sequence of loads is also a calculated characteristic of the cyclic load.

According to some embodiments, the data analysis and augmented control system 110 may determine the cyclic loading on the wind turbine assembly and calculate the cyclic loading's effect on the life span of the wind turbine assembly or specific components of the wind turbine assembly 101. In some embodiments, a cyclic load is calculated or determined as the load on one or more components of the wind turbine assembly over one revolution of the wind turbine. Thus, the data analysis and augmented control system 110 may determine the cyclic loading on the wind turbine over a period of time as a function of an amount of revolutions completed in that period of time.

FIG. 4 depicts an example of how the cyclic load 401 on a component may be reduced through reduced power limits 403 during a high load event 407. In some embodiments, cyclic loads applied to wind turbine assembly components are calculated using the inputs from the sensors 115 and the mechanical state (i.e., operating states) 132 of the wind turbine assembly 101 (including for example pitch angle) as described above.

The graph in FIG. 4 depicts an example calculated characteristic of a cyclic load 401 on a component of the wind turbine assembly 101 over time. The maximum power limit 403 of the wind turbine assembly 101 is shown with augmented control (dash-dot line) 403a and without augmented control (dashed line) 403b. The component cyclic load limit 405 for the example component is also shown. According to some embodiments, the component cyclic load limit 405 is the determined maximum cyclic load the component should experience at any given time. This component cyclic load limit 405 may be based on (or in consideration of) a number of factors including, prevention of damage and fatigue, maximizing the lifespan of the respective component, or selecting the proper balance of energy generation to wear on the respective component.

According to some embodiments, the data analysis and control augmentation system 110 may mitigate the high impact event 407 by reducing the power limit 403 of the wind turbine assembly 101 when the high impact event 407 occurs and then restore the power limit 403 to its original value when the cyclic load 401 is reduced as environmental conditions and the operating state of the wind turbine assembly changes. This is shown in FIG. 4 by the solid line representing the cyclic load 401a with augmented control from the data analysis and control augmentation system 110.

For example, when the cyclic load 401 on a component of the wind turbine assembly exceeds the component cyclic load limit 405, the data analysis and control augmentation system 110 provides a power limit control signal 112 to cause the power limit 403a on the wind turbine assembly to be lowered. As the high impact event 407 continues and the cyclic load 401a again passes the component cyclic load limit 405, the data analysis and control augmentation system 110 again causes the power limit 403a to be further reduced. When the high impact event 407 ends and the wind turbine assembly 101 becomes under loaded, the data analysis and control augmentation system 110 then causes the normal power limit 403a to be restored.

FIG. 4 also illustrates for reference the cyclic load 401b without augmented control (dashed line) from the data analysis and control augmentation system 110. If the normal power limit level 403b is unchanged during the high impact event 407, then the cyclic load 401b on the component maintains a cyclic load level above that of the determined load limit 405 possibly resulting in significant damage or fatigue to the component. Thus, the data analysis and control augmentation system 110 is able to prevent this significant damage or fatigue (which leads to loss of lifespan) to the component caused by momentary high impact events with a minimized loss of power generation, as shown in FIG. 4.

According to some embodiments, the data analysis and control augmentation system 110 may determine the existence or occurrence of an high impact event 407 based on characteristics of the sequence of loads, for example the rate of change of the sequence of loads or the amplitude of the load at a given time.

The cyclic load limit 405 or maximum power limit 403 may be determined in several different ways and a number of components of the wind turbine assembly can be considered taking the one that is most severely loaded compared to its target cyclic load limit state as the limiting value. The cyclic load limit for individual components can be defined as a static value for a specific component or they may be a function of the current operating conditions, power generation, rotor speed, and so forth depending on the specific wind turbine assembly model. Alternatively, given a sufficient model of the wind turbine assembly and knowledge of the wear of components, it is possible to calculate the cyclic load limit for a given set of loading conditions. In determining the cyclic load limit, the relative cost of producing less power and saving wear and tear on components can be taken into account to optimize the operation of the turbine.

Regardless of how a cyclic load limit is determined, if overloading of a component occurs such that it would significantly reduce a predicted lifetime of that component below an acceptable limit, then the power limit of the turbine is reduced until an acceptable loading is achieved. Once the load is below the cyclic load limit, the power limit may again be increased.

The data analysis and control augmentation system 110 may present a control input to the wind farm system 130, wherein the control input represents a recommended maximum power limit 112 for each wind turbine assembly at which measurements are made. According to some embodiments, the data analysis and control augmentation system 110 may recommend stopping the wind turbine or cause the wind turbine to be stopped.

Figure 8:
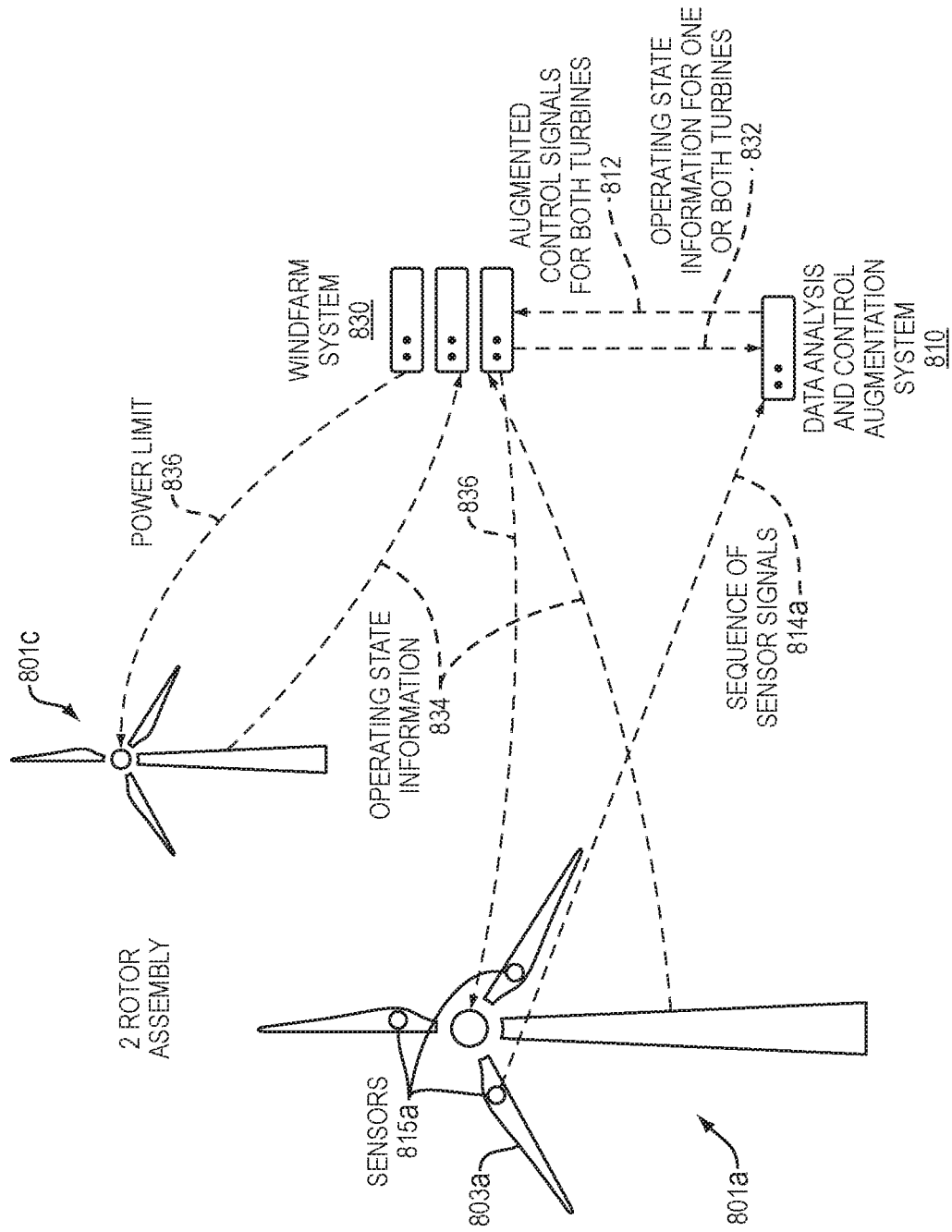
FIG. 8 is a diagram of an augmented control feedback loop according to an embodiment in which control input augmentation is provided to the wind turbine assembly without sensors based on determined loads and an operating state of a wind turbine assembly with sensors.
Figure 9:
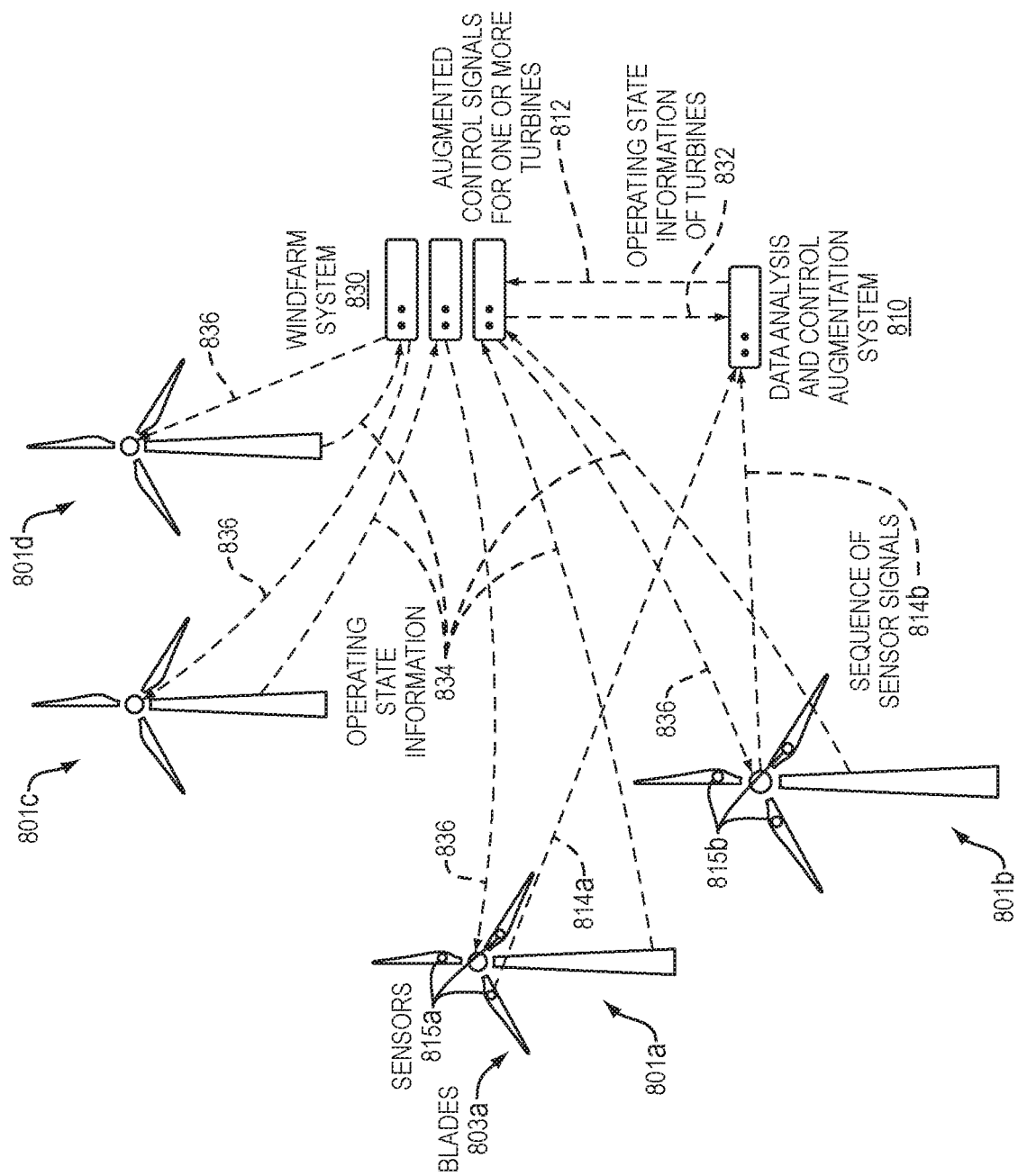
FIG. 9 is a diagram of an augmented control feedback loop according to an embodiment in which control input augmentation is provided to multiple wind turbine assemblies without sensors based on determined loads and operating states of multiple wind turbine assemblies with sensors.

Additional wind turbine assemblies, (as shown in FIG. 8 and FIG. 9), which are not equipped with sensors as part of the augmented control system 110, may be controlled based on the analysis of selected wind turbine assemblies at the wind farm. Additional information about the operating state of a wind turbine may also be gathered from other transducers/sensors, including, for example, one or more accelerometer sensors. This additional data from the data acquisition system may also be transmitted to the data analysis and control augmentation system 110.

According to some embodiments, calculations on the data analysis and control augmentation system may be done in near real-time by processing data for a previous, small, time interval immediately after the data is received, with a minimum time interval defined by, for example, one complete revolution of the rotor. Typically, this analysis is performed for a period of time to average the results and ensure a statistically meaningful measurement is obtained prior to providing a modified control signal to the wind farm system.

According to some embodiments, the data analysis and control augmentation system 110 may be located locally at the wind farm or at a remote location communicating with the wind farm system 130 over an extended distance via any type of communications network capable of carrying data at rates compatible with embodiments. Accordingly, further embodiments of the data analysis and augmented control system 110 may also be implemented in a variety of computer architectures, physical, virtual, cloud computers, and/or some combination thereof, and, thus, the data analysis and augmented control system 110 described herein and illustrated in FIG. 1 is intended for purposes of illustration only and not as a limitation of the embodiments. Additionally, the data analysis and augmented control system 110 may be controlled remotely, thus allowing the data analysis and augmented control system 110 to be enabled and disabled remotely for testing or operational purposes.

Typically, the sensors 115 (e.g., strain gauges, transducers, or other sensors known in the art) enable measurement of a root bending moment in one or two dimensions for each blade 103 that is equipped with one or more sensors 115.

Figure 5:
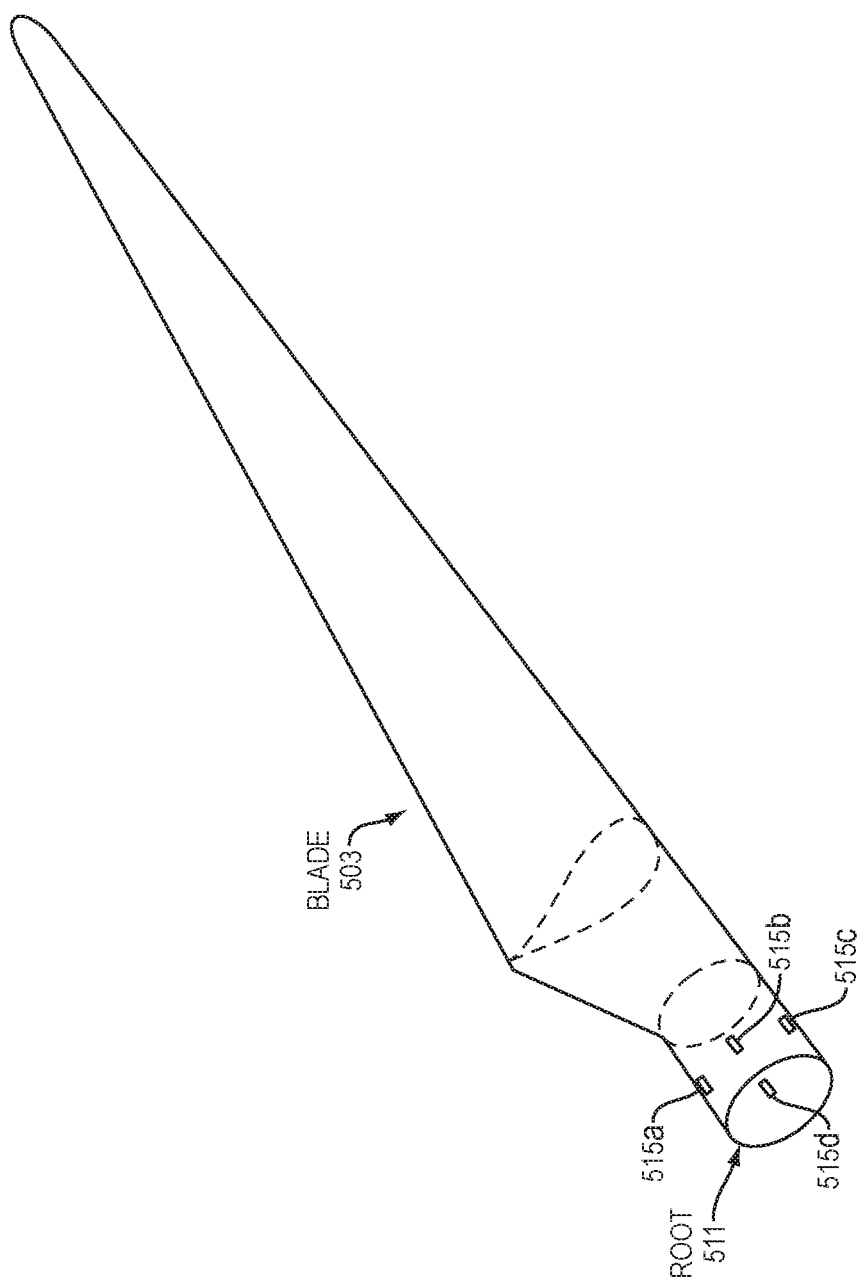
FIG. 5 is a diagram of a wind turbine blade with sensors attached according to some embodiments.

FIG. 5 depicts an embodiment including sensors (515a, 515b, 515c and 515d), such as strain sensors, mounted in or on the blade 503 to measure bending moments applied to a hub 704 (shown in FIG. 7) due to gravitational and wind loading on the blade 503. An example embodiment includes sensors in the axial direction on high (sensor 515b) and low (sensor 515d) pressure sides of the blade 503 and leading (sensor 515c) and trailing (515a) edges. According to some embodiments, the sensors (515a, 515b, 515c and 515d) measure the deformation or strain of the blade 503 that is proportional to the flap-wise and lead-lag wise bending moments of the blade and may be mounted near a root 511 of the blade 503 where the blade 503 is attached to the hub 704 of a wind turbine assembly 101.

In some embodiments, the sensors (515a, 515b, 515c and 515d) may be strain sensors configured into two separate Wheatstone bridge circuits which, when connected to the data analysis and control augmentation system 110, measure bending strain primarily due to flap-wise and lead-lag-wise bending of the blade 503. For example, the Wheatstone bridge circuits may be configured as described in Hoffmann, Karl, "Applying the wheatstone bridge circuit," HBM, 1974 (herein incorporated by reference). Because there will be some cross-sensitivity of the sensors, a calibration matrix is may be employed as described in the IEC 61400-13:2015 International Standard: Measurement of Mechanical Loads, Ed. 1.0 12-2015 (herein incorporated by reference) to relate the measured strains to the applied moments. The calibration matrix can be written as:

$$\begin{Bmatrix} S_x - S_{x0} \\ S_y - S_{y0} \end{Bmatrix} = \begin{bmatrix} A_{11} & A_{12} \\ A_{21} & A_{22} \end{bmatrix} \times \begin{Bmatrix} M_x \\ M_y \end{Bmatrix}$$

where $S_x$ and $S_y$ are the measured strains corresponding to the strain gauges mounted on the leading (sensor 515c) and trailing (sensor 515a) edges and the high (sensor 515b) and low (sensor 515d) pressure sides respectively, $S_{x0}$ and $S_{y0}$ are the offset strain measurements when zero load is applied, $M_x$ and $M_y$ are the applied bending moments in the blade coordinate system, and $A_{11}$, $A_{12}$, $A_{21}$, and $A_{22}$ are the coefficients of the cross talk matrix that relate strain to moment.

Gravitational loads when the turbine is stopped or rotating slowly may be used to determine the coefficients of the calibration matrix using linear regression, as described in the appendix B6 of the IEC 61400-13 reference. Once the coefficients are known, the bending moments may be calculated continuously as a function of time from the acquired strain data by solving the linear set of equations for $M_x$ and $M_y$.

Other measurement techniques for determining the $M_x$ and $M_y$ blade bending moments may be employed in order to collect the required data. Examples include methods for measuring blade displacement using optical or mechanical means. In some cases, the moments may be calculated by an outside analysis system prior to the data reaching the analysis and control augmentation system 110, or these calculations may be incorporated into the data analysis and control system 110 using raw sensor signal values as input.

Additional transducers/sensors to measure rotor position and acceleration may also be employed. By referencing gravity, the rotor azimuth position may be determined from the signal of an accelerometer mounted in the hub 704 or a blade 503, which may provide an extrema acceleration value twice each revolution. According to some embodiments, several parameters are also collected from the wind farm system 130 (e.g., a SCADA). These parameters may include the pitch angle of each blade, the turbine power, power limit, and the wind speed and direction. Alternatively, pitch angle may be determined from additional sensors added in the rotor itself, as known in the art.

Once the blade root bending moments are calculated and the pitch angles of the blades and azimuth of the rotor are known, the bending moments applied to the main shaft of the wind turbine assembly may be calculated.

Figure 6:
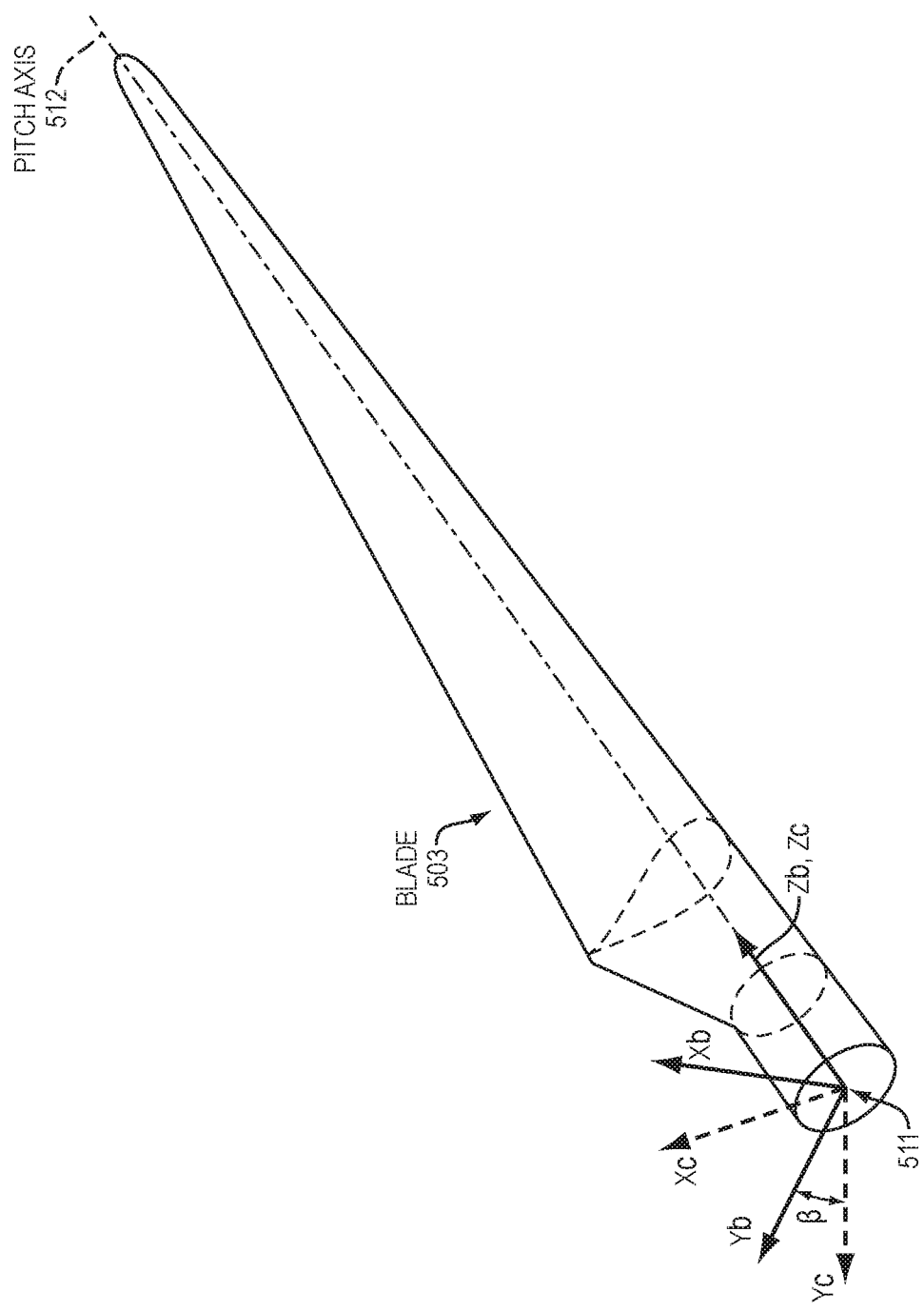
FIG. 6 is an illustration depicting a wind turbine blade root coordinate system $\{X_b, Y_b, Z_b\}$ that is rotated relative to a wind turbine hub coordinate system $\{X_c, Y_c, Z_c\}$ when the wind turbine blade pitches.

FIG. 6 shows a blade root coordinate system $\{X_b, Y_b, Z_b\}$ which is rotated relative to the hub coordinate system $\{X_c, Y_c, Z_c\}$ when the blade pitches. The blade coordinates have an origin at the blade root with the Z-axis along the pitch axis 512 of the blade, the Y-axis pointing toward the trailing edge and the X-axis providing a right handed coordinate system, which typically means it is toward the high pressure or upwind side of the blade. Loads are measured in the blade coordinate system. A coordinate transformation corresponding to the pitch angle of the blade β is used to convert to hub coordinates for that blade.

$$M_{xc}^i = M_{xb}^i \cos\beta_i + M_{yb}^i \sin\beta_i$$

$$M_{yc}^i = M_{yb}^i \cos\beta_i - M_{xb}^i \sin\beta_i$$

where $M_{xc}^i$, and $M_{yc}^i$, are the moments about the $X_c$ and $Y_c$ axes, respectively, of the ith blade and $\beta_i$ is the pitch angle of the ith blade.

Figure 7:
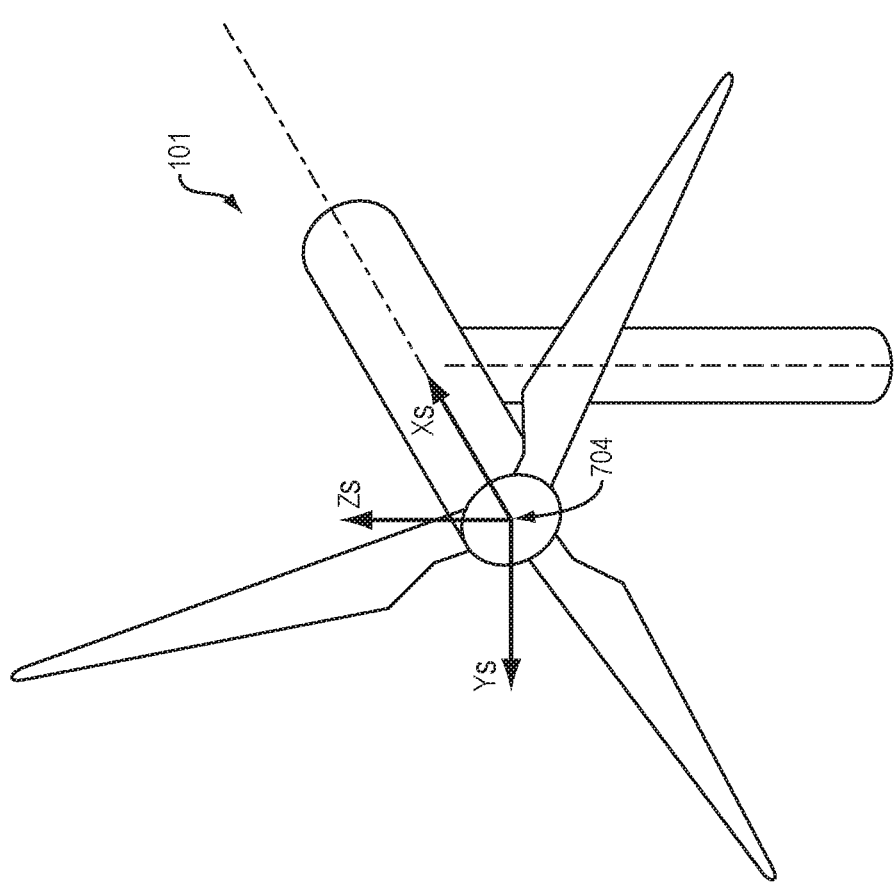
FIG. 7 is an illustration depicting a wind turbine shaft coordinate system $\{X_s, Y_s, Z_s\}$.

FIG. 7 shows a shaft coordinate system. These coordinates do not rotate with the rotor, and the resulting loads on the gearbox, bearing, or other components in the wind turbine assembly are calculated in this coordinate system. From hub coordinates, a coordinate transformation to shaft coordinates corresponds to a rotation about the $X_c$ axis by the azimuth position of the rotor.

$$M_{ys} = \sum_{i=1}^{3} M_{yc}^i \cos\theta_i$$

$$M_{zs} = \sum_{i=1}^{3} M_{yc}^i \sin\theta_i$$

where $M_{ys}$ and $M_{zs}$ are the moments about the $Y_s$ and $Z_s$ shaft axes, respectively, and $\theta_i$ is the azimuth angle of the ith blade. From the blade root bending moments, pitch angle of each blade and rotor azimuth, the loads on the main shaft of the turbine may be calculated. According to some embodiments, this calculation is performed in the analysis and control augmentation system 110 by calculating the product of the blade root bending moments and a series of rotation matrices that account for the blade pitch, hub geometry, and rotor azimuth position. In some embodiments, the loads from all three blades are then added together to determine the load on the main shaft as a function of time over a complete revolution of the turbine.

In an embodiment in which a physical measurement is made, a minimum of one blade must be instrumented, but additional instrumentation may be employed to provide additional accuracy of the loads measurements. If not all blades are instrumented, the loads on the non-instrumented blades (i.e., blades without sensors) are estimated by referencing the load on the instrumented blade as a function of azimuth position and using that load with a phase shift to account for the position of the blade in question. Thus, in one embodiment, the load on a non-instrumented blade at a given time is evaluated to be equal to the load on the instrumented blade at the closest earlier or later time when the instrumented blade was in the current azimuth position of the non-instrumented blade. These estimated loads are then added to the known load(s) to determine the total load on the main shaft. The loads over one or more complete revolutions of the turbine are used to estimate the mean, maximum, minimum, standard deviation and fatigue on wind turbine assembly components including, but not limited to, blades, tower, drivetrain and pitch drive.

According to some embodiments, the measured loading on the main shaft and other turbine components is compared to a limit state and when that limit state is exceeded, a control signal is sent to the wind farm system 130 or directly to the turbine controller on each wind turbine assembly 101, to reduce the power limit (thereby derating) the wind turbine assembly 101 or even stopping the wind turbine assembly 101 in order to bring loads into an acceptable range. As wind and operating conditions change over time, the power limit may then be adjusted again to keep loads below the threshold to keep wear and tear (i.e., fatigue) at an acceptable level while still generating power. As loading is further reduced, the power limit may again be increased by the data analysis and augmented control system. Thus, an active feedback loop (e.g., the feedback loop illustrated in FIG. 2) is created between the data analysis and augmented control system 1010 and wind turbine assembly 101 through the wind farm system 130 or directly with the turbine controller on the wind turbine assembly 101.

Several benefits of the system to a wind farm result from embodiments of this disclosure. In order to reduce potentially damaging loads to the wind turbine, the data analysis and augmented control system may provide an output signal (i.e., an "augmenting" control input signal) that will cause the wind farm controller to reduce the maximum power produced from one or more wind turbines when critical loading conditions are observed by the data processing. When environmental conditions change and the loading is reduced, the power limit may be increased again to maximize annual power production while simultaneously reducing component failures due to overloading.

The occurrence of high impact loading events may be identified and tracked using the system described in this disclosure. High impact events are events where the turbine is significantly loaded or overloaded beyond its typical design loads, resulting in a rapid consumption of the remaining life of one or more components. The frequency and duration of high impact events may be used to assess when additional inspection or maintenance could be required. Often high impact events will eventually lead to a wind turbine assembly fault resulting in a shutdown event in the controller and a loss of power production until the wind turbine assembly is restored to operation. By identifying when a high impact event begins the system described in this disclosure can modify the operation of the wind turbine assembly, reducing the loading and eliminating the fault from occurring. Reduced faults increases annual power production. In addition, the actual lifetime loading on the wind turbine assembly is tracked and this information can be used to extend the useful lifespan of a turbine in some cases.

It should be understood that the augmented control server, such as the augmented control system 110 of FIG. 1, may be communicatively coupled to the wind farm controller via a standard or customized interface port using any communications protocol capable of supporting data communications that include the augmenting control signal or representations thereof at a data rate suitable to exercise embodiments described herein or alternatives thereof.

According to some embodiments, for example the embodiments depicted in FIG. 8 and FIG. 9, sensors and hardware may only be installed on a subset of wind turbine assemblies of a wind farm.

FIG. 8 illustrates an augmented control feedback loop according to an embodiment where control input 812 is provided to a wind turbine assembly 801c without sensors based on the determined loads and operating state of a wind turbine assembly 801a with sensors. Similar to the embodiment shown and described in reference to FIG. 1, the wind farm system 830 receives operating state information 834 from and controls the power limit 836 of the wind turbine assemblies 801a and 801c. In some embodiments, the data analysis and augmented control system 810 may receive operating state information 832 for one or both of the wind turbine assemblies and a sequence of sensor signals 814a used to determine load on a blades from the sensors 815a on the blades 803a of the wind turbine assembly 801a. The data analysis and augmented control system 810 may then calculate the cyclic loading on the wind turbine assembly 801a, as described above, and estimate the cyclic loading on the wind turbine assembly 801c by translating the calculated cyclic loading to the wind turbine assembly 801c using a model developed for the wind farm.

FIG. 9 illustrates an augmented control feedback loop according to an embodiment where control input 812 is provided to multiple wind turbine assemblies 801c and 801d without sensors based on the determined loads and operating state of multiple wind turbine assemblies 801a and 801b with sensors.

Similar to the embodiment shown and described in reference to FIG. 8, the wind farm system 830 receives operating state information 834 from and controls the power limit 836 of the wind turbine assemblies (801a-801d respectively). In some embodiments, the data analysis and augmented control system 810 may receive operating state information 832 for one or more of the wind turbine assemblies 801, a sequence of sensor signals 814a from the sensors 815a on the blades 803a of the wind turbine assembly 801a and a sequence of sensor signals 814b from the sensors 815b on the blades 803b of the wind turbine assembly 801b.

The data analysis and augmented control system 810 may then calculate the cyclic loading on the wind turbine assembly 801a and the wind turbine 801b, as described above, and estimate the cyclic loading on the wind turbine assemblies 801c and 801d by translating the calculated cyclic loading to the wind turbine assemblies without sensors 801c and 801d using a model developed for the wind farm.

In some embodiments, the power limit for a wind turbine assembly at the wind farm can be reduced based on loading information from another turbine or a set of turbines with sensors installed, using a wind farm specific model. An embodiment of this approach assumes that the loads on a neighboring turbine are the same as those measured on the turbine next to it. In this case, the power limit reduction applied to both turbines would be the same or substantially the same, such as ±1%, ±2%, ±5%, or ±10%. If turbines are instrumented on either side or surrounding one or more un-instrumented turbines, then those without instrumentation may be controlled based on the average loads measured on the surrounding turbines. In a more complex approach, a model of wind patterns over the wind farm may be incorporated to determine the relative loading on a turbine based on curve fitting the model to the known loading conditions on the selected instrumented turbines. Other methods of generating and applying models to wind turbines within a given environment may be applied.

Figure 10:
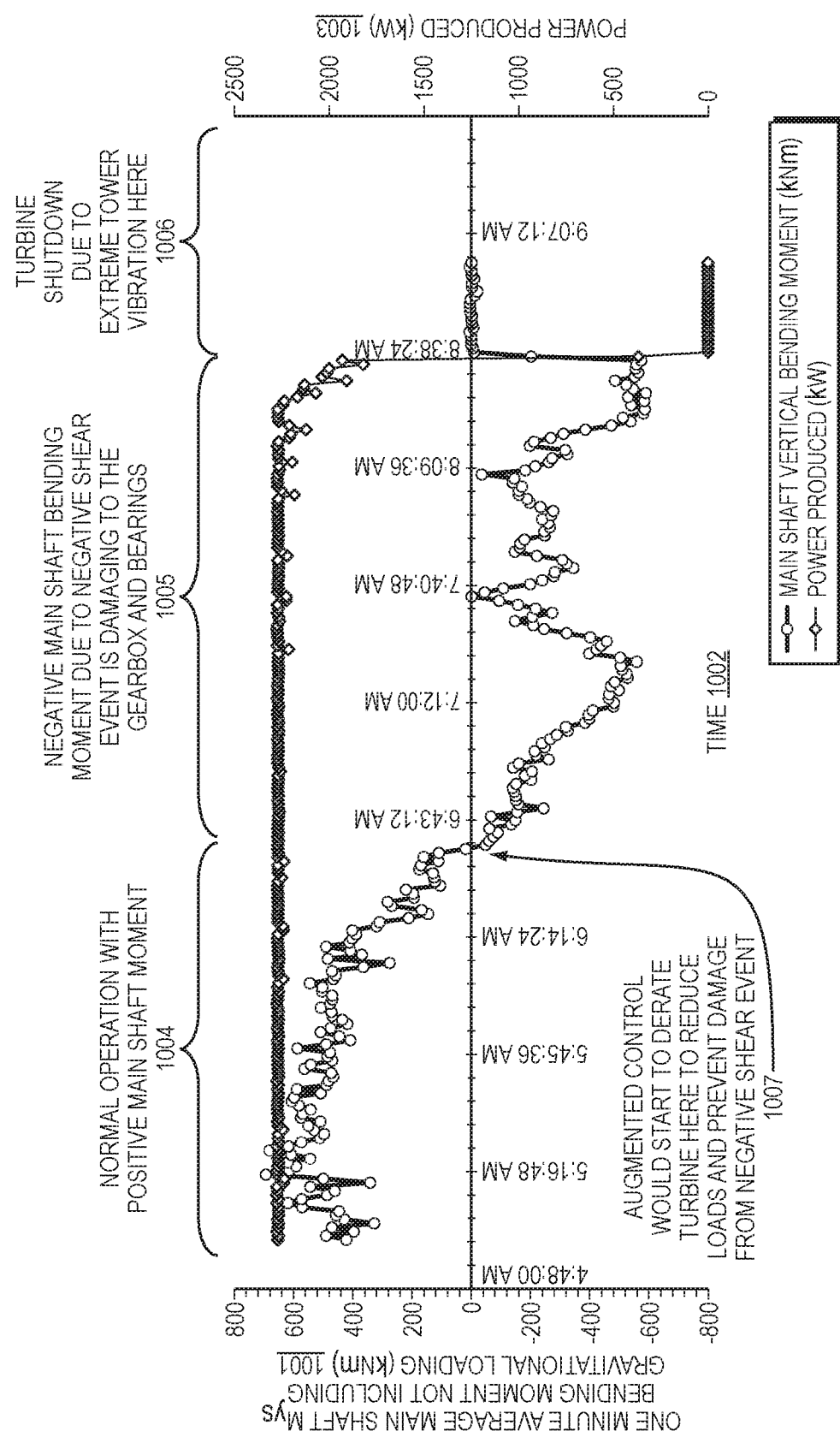
FIG. 10 is a graph of four hours of representations of the mean moment on the main shaft of a turbine along with the corresponding power output during a negative shear event.

Additional examples of representations of cyclic loads are presented in FIG. 10 and FIG. 11. FIG. 10 shows a graphical representation of the one minute average (or mean) main shaft bending moment 1001 $M_{ys}$ as a function of time 1002. $M_{ys}$ is calculated from the representations of instantons moment on each blade as described in this disclosure. The one minute average of $M_{ys}$ is then calculated and plotted. The one minute average power produced by the turbine 1003 is also shown on the same plot. During the selected four hour period of time, the one minute average shaft moment $M_{ys}$ goes from a normal positive value 1004 to a negative value 1005 while the turbine continues to operate at full power (as shown without augmented control). This combination of operating at full power and a negative main shaft bending moment can damage drivetrain components and contribute to premature failure of those components.

At the end of the time period plotted in FIG. 10, the turbine shuts down due to excessive tower vibration 1006. Had the power level of the turbine been reduced when the one minute average main shaft bending moment first trended negative 1007 the damage due to this event may have been avoided. Additionally, the shutdown event may also have been avoided in that scenario as the tower would to be excited as much allowing the turbine to ride through the event without faulting.

Embodiments of the present disclosure would have prevented the damage due to this event at least by reducing the power limit of the wind turbine assembly where the one minute average bending moment $M_{ys}$ 1001 became negative 1007.

According to some embodiments, a data processing system communicatively coupled to a controller controlling a wind turbine assembly may determine a sequence of loads on a blade by receiving signals from sensors located on at least one of the blades of the wind turbine assembly. For example, the sensors may be arranged on a blade as depicted in FIG. 5. In some embodiments, the sensors may measure the deformation or strain of the blade that is proportional to the flap-wise and lead-lag wise bending moments of the blade and may be mounted near a root of the blade where the blade is attached to the hub of a wind turbine assembly.

According to some embodiments, the data processing system may determine a sequence of loads from the sensor signals. For example, as explained above, the data processing system may determine a sequence of blade root bending movements from the sensor signals. In some embodiments, the data processing system may calculate a characteristic of a cyclic load on the blade over a least one revolution of the rotor as a function of the determined sequence of blade root bending moments, and present an auxiliary control input signal to the controller as a function of the calculated characteristic.

Additionally, the data processing system may determine a sequence of loads on other components of the wind turbine assembly beside the blade. For example, the data processing system may receive signals from other additional transducers/sensors or collect data from the wind farm system. Once the data processing system determines (or collects) the blade root bending moments, pitch angles of the blades and azimuth of the rotor, the bending moments applied to the main shaft of the wind turbine assembly may be calculated as described above. The azimuth of the rotor may be determined by retro fitting an accelerometer into the hub or a blade of the wind turbine assembly. Alternatively, the data processing system may collect data from the wind farm system (e.g., SCADA) in order to determine the azimuth of the rotor and the pitch of the blades.

Referring back to the example data in FIG. 10, in this case the data processing system calculated the one minute average of the bending moments applied to the main shaft by averaging together the bending moments over a one minute time period. Each value for the one minute average of the bending moments applied to the main shaft is an example of a calculated characteristic of a cyclic load on the main shaft of the wind turbine assembly.

In the example scenario of FIG. 10, the component limit for the main shaft vertical bending moment would be zero. According to some embodiments, the data processing system presents an auxiliary control input signal to the controller of the wind turbine to augment control of the wind turbine to derate the wind turbine (i.e., lower the power limit) when the main shaft vertical bending moment values moved past zero and became negative 1007. Thus, the turbine shutdown due to extreme tower vibration 1006 would have been averted by the data processing system.

FIG. 11 provides an example of the one minute average representations of cyclic loads for the turbine in tabular form during the first part of the time period plotted in FIG. 10. Each row of the table in FIG. 11 is the mean value of the cyclic response for the minute represented in the Time column 1101. The blade root moments for blade 1 are given in blade coordinates $M_{xb}$ 1102 and $M_{yb}$ 1103 and hub coordinates $M_{xb}$ 1104 and $M_{yb}$ 1105. The other two blades (not shown) provide similar results. The mean vertical main shaft bending load not including gravity $M_{ys}$ 1106 and horizontally $M_{zs}$ 1107 are calculated from the higher resolution 20 Hz representations blade loads as described in this disclosure.

Figure 12:
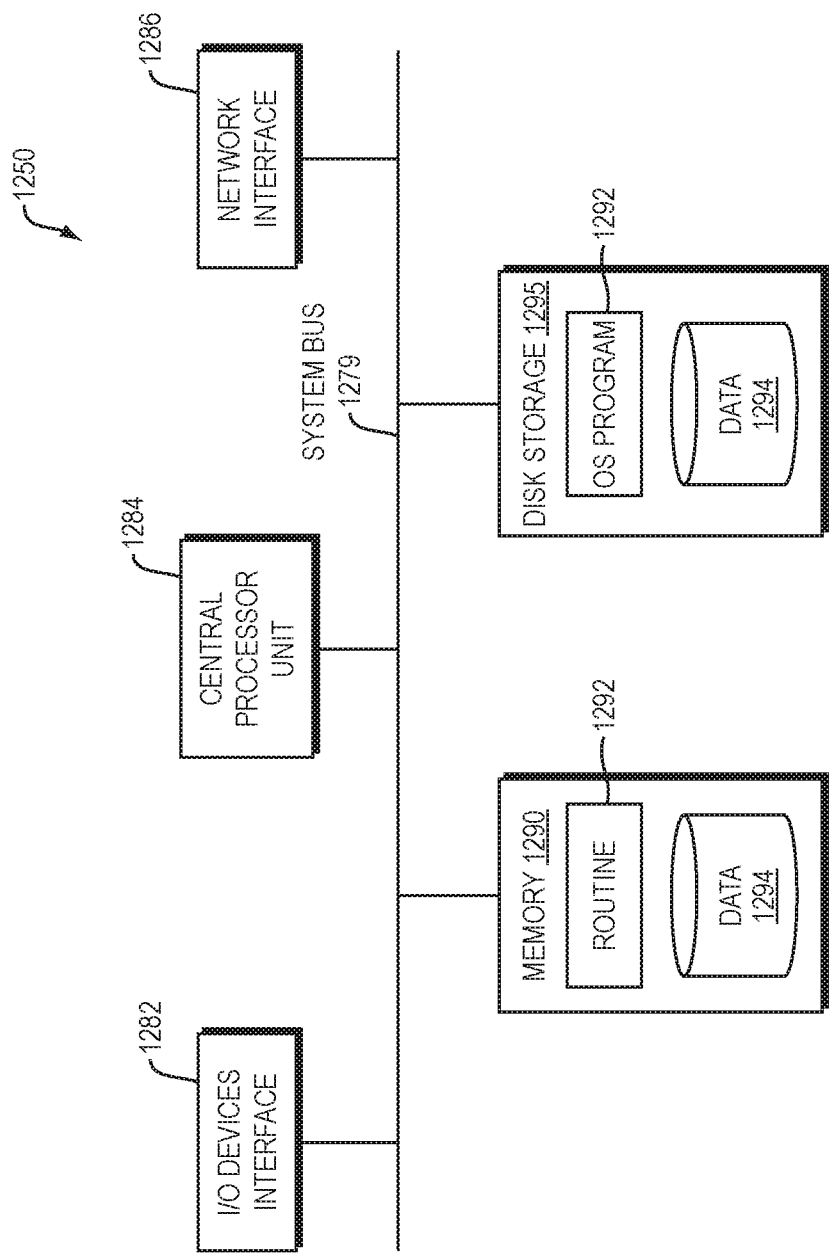
FIG. 12 is a block diagram of the internal structure of a computer in which various embodiments of the present invention may be implemented.

FIG. 12 is a block diagram of an internal structure of a computer 1250 in which various embodiments of the present invention may be implemented. For example, the computer 1250 may act as a data analysis and augmented control system 110 as depicted in FIG. 1. The computer 1250 contains a system bus 1279, where a bus is a set of hardware lines used for data transfer among the components of a computer or processing system. Bus 1279 is essentially a shared conduit that connects different elements of a computer system (e.g., processor, disk storage, memory, input/output ports, network ports, etc.) that enables the transfer of information between the elements. Attached to system bus 1279 is I/O device interface 1282 for connecting various input and output devices (e.g., sensors, transducers, keyboard, mouse, displays, printers, speakers, etc.) to the computer 1250. Network interface 1286 allows the computer 1250 to connect to various other devices attached to a network (e.g., wind farm system 130, SCADA system, wind farm controller, individual turbine controllers, weather condition sensors, data acquisition system etc.). Memory 1090 provides volatile storage for computer software instructions 1292 (e.g., instructions for the processes/calculations described above, for example, receiving operating state information from the wind farm system and sensor data from the blade sensors to calculate cyclic loads, the processes for cycle counting, calculating the cyclic loads, determining the cyclic loading's effect on the life span of a wind turbine assembly or specific component thereof, the bending moment calculations and calibration calculations) and data 1294 used to implement an embodiment of the present disclosure. Disk storage 1295 provides non-volatile storage for computer software instructions 1292 and data 1294 used to implement an embodiment of the present disclosure.

Central processor unit 1284 is also attached to system bus 1279 and provides for the execution of computer instructions.

In one embodiment, the processor routines 1292 (e.g., instructions for the processes/calculations described above) and data 1094 are a computer program product (generally referenced 1292), including a computer readable medium (e.g., a removable storage medium such as one or more DVD-ROM's, CD-ROM's, diskettes, tapes, etc.) that provides at least a portion of the software instructions for the invention system. Computer program product 1292 can be installed by any suitable software installation procedure, as is well known in the art.

In another embodiment, at least a portion of the software instructions may also be downloaded over a cable, communication and/or wireless connection.

Further, the present invention may be implemented in a variety of computer architectures. The computer of FIG. 12 is for purposes of illustration and not limitation of the present invention. In some embodiments of the present disclosure, the data analysis and augmented control system may function as a computer to perform aspects of the present disclosure.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network (e.g., the data analysis and augmented control system 110, wind farm system 130, the sensors, the turbine controllers within each wind turbine assembly, and any other devices or sensors on the wind farm may all be connected through a network located on the wind farm). Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims. For example, the disclosed augmented control is described in the context of wind farms and wind turbines, but may be applied to augment control of other turbines, such as hydroelectric turbines, Francis turbines, steam turbines, gas turbines, etc.

What is claimed is:

1. A method of augmenting control of a wind turbine assembly, the method comprising:
   determining a sequence of loads on a blade of a wind turbine in a wind turbine assembly in a revolution of a rotor associated with the blade;
   calculating a characteristic of a cyclic load on a component of the wind turbine assembly, the characteristic being a function of the determined sequence of loads over at least one revolution of the rotor; and
   presenting an auxiliary control input signal to a controller of the wind turbine to augment control of the wind turbine as a function of the calculated characteristic of the cyclic load.

2. The method of claim 1 wherein the sequence of loads is any of: a sequence of bending moments of the blade in one or more directions, a sequence of axial forces, or a sequence of shear forces.

3. The method of claim 1 wherein the calculated characteristic of the cyclic load is a mean of the sequence of loads, an extrema of the sequence of loads, an amplitude of the sequence of loads, or a frequency of the sequence of loads.

4. The method of claim 1 further comprising obtaining an operating state of the wind turbine assembly; and wherein the control input signal to augment control of the wind turbine assembly is a function of the calculated characteristic of the cyclic load and the obtained operating state of the wind turbine assembly.

5. The method of claim 1 further comprising determining the acceleration of a given component of the wind turbine assembly; and wherein the calculated characteristic of the cyclic load is calculated as a function of the determined sequence of loads and the determined acceleration of the given component over at least one revolution of the rotor associated with the blade.

6. The method of claim 1 wherein presenting the auxiliary control input signal to the controller of the wind turbine to stop operation or modify the power limit as a function of the calculated characteristic of the cyclic load.

7. The method of claim 1 wherein the wind turbine assembly is a first wind turbine assembly, and further comprising presenting an auxiliary control input signal to a controller of a second wind turbine assembly as a function of the calculated characteristic of the cyclic load of the first wind turbine assembly.

8. The method of claim 7 further comprising presenting the auxiliary control input signal to the controller of the second wind turbine assembly as function of the calculated characteristic of the cyclic load of the first wind turbine assembly and an operating state of the second wind turbine assembly.

9. The method of claim 7 further comprising presenting the auxiliary control input signal to the controller of the second wind turbine assembly as function of the calculated characteristic of the cyclic load of multiple first wind turbine assemblies and an operating state of the second wind turbine assembly.

10. The method of claim 1 further comprising presenting the auxiliary control input signal to the controller of the first wind turbine assembly as function of the calculated characteristic of the cyclic load of the first wind turbine assembly and at least one second wind turbine assembly.

11. The method of claim 1 further comprising evaluating an effect of the calculated characteristic of the cyclic load on expected lifespan the component of the wind turbine assembly.

12. The method of claim 11 wherein the auxiliary control input signal is a function of the rate of consumption of the expected lifespan of the component of the wind turbine assembly.

13. The method of claim 1 further comprising obtaining operating states of the wind turbine assembly; and wherein the sequence of loads on the blade and the acceleration of the given component is determined from the obtained operating states of the wind turbine assembly.

14. The method of claim 1 wherein the sequence of loads is determined from representations of loads measured by at least one sensor on or in the blade of the wind turbine assembly.

15. The method of claim 1 further comprising determining a sequence of loads or a characteristic of the cyclic load on a drivetrain of the wind turbine assembly, yaw drive of the wind turbine assembly, or a tower of the wind turbine assembly as a function of the determined sequence of loads on the blade, or the acceleration of a component of the wind turbine assembly.

16. A system for augmenting control of a wind turbine assembly comprising:
   a data processing system communicatively coupled to a controller controlling a wind turbine assembly, the data processing system configured to:

determine a sequence of loads on a blade of a wind turbine in a wind turbine assembly in a revolution of a rotor associated with the blade, calculate a characteristic of a cyclic load on a component of the wind turbine assembly, the characteristic being a function of the determined sequence of loads over at least one revolution of the rotor, and present an auxiliary control input signal to the controller of the wind turbine to augment control of the wind turbine as a function of the calculated characteristic of the cyclic load.

17. The system of claim 16 wherein the sequence of loads is any of: a sequence of bending moments of the blade in one or more directions, a sequence of axial forces, or a sequence of shear forces.

18. The system of claim 16 wherein the calculated characteristic of the cyclic load is a mean of the sequence of loads, an extrema of the sequence of loads, the amplitude of the sequence of loads, or the frequency of the cyclic load.

19. The system of claim 16 wherein the data processing system is further configured to obtain an operating state of the wind turbine assembly; and wherein the auxiliary control input signal is a function of the calculated characteristic of the cyclic load and the obtained operating state of the wind turbine assembly.

20. The system of claim 16 wherein the data processing system is further communicatively coupled to a wind farm database.

21. The system of claim 16 wherein the data processing system is further configured to determine acceleration of a given component of the wind turbine assembly; and wherein the calculated characteristic of the cyclic load is calculated as a function of the determined sequence of loads and the determined acceleration of the given component over at least one revolution of the rotor associated with the blade.

22. The system of claim 16 wherein presenting the auxiliary control input signal causes the wind farm controller to reduce operation of the wind turbine assembly as a function of the calculated characteristic of the cyclic load.

23. The system of claim 16 wherein the wind turbine assembly is a first wind turbine assembly, and the data processing system is further configured to present an auxiliary control input signal to a controller of a second wind turbine as a function of the calculated characteristic of the cyclic load of the first wind turbine assembly.

24. The system of claim 16 wherein the data processing system is further configured to present auxiliary control input signal to a controller of a second wind turbine as function of the calculated characteristic of the cyclic load of two or more wind turbine assemblies.

25. The system of claim 16 wherein the data processing system is further configured to evaluate an effect of the calculated characteristic of the cyclic load on expected lifespan the wind turbine assembly.

26. The system of claim 16 wherein the data processing system is further configured to determine an occurrence of a high impact event on the wind turbine assembly as a function of the calculated characteristic of the cyclic load.

27. The system of claim 16 further comprising a data collection system communicatively coupled to the data processing system, the data collection system configured to measure representations of the sequence of loads on the blade of a wind turbine assembly and communicate the measured representations to the data processing system; and wherein the data processing system is further configured to determine the sequence of loads on a blade of a wind turbine assembly in a revolution of a rotor associated with the blade from the measured representations.

28. The system of claim 27 wherein the data collection system includes at least one sensor on or in the blade and an accelerometer on or in a given component of the wind turbine assembly.

29. The system of claim 27 wherein the data processing system is further configured to determine a sequence of loads on a drivetrain of the wind turbine assembly, a yaw drive of the wind turbine assembly, or a tower base of the wind turbine assembly as a function of the measured representations.

30. The system of claim 27 wherein the data processing system is further configured to calculate a characteristic of a cyclic load on a drivetrain of the wind turbine assembly, a yaw drive of the wind turbine assembly, or a tower base of the wind turbine assembly as a function of the measured representations.

* * * * *